(12) United States Patent
Grasboeck et al.

(10) Patent No.: US 7,704,559 B2
(45) Date of Patent: Apr. 27, 2010

(54) EPOXY RESINS WITH IMPROVED ELASTICITY

(75) Inventors: Rosemaria Grasboeck, Graz (AT); Florian Lunzer, Barcelona (ES); Thomas Fischer, Graz (AT); Sandra Reisinger, Weiz (AT)

(73) Assignee: Cytec Surface Specialities Austria GmbH (AT)

( * ) Notice: Subject to any disclaimer, the term of this patent is extended or adjusted under 35 U.S.C. 154(b) by 647 days.

(21) Appl. No.: 11/658,608

(22) PCT Filed: Jul. 18, 2005

(86) PCT No.: PCT/EP2005/007796

§ 371 (c)(1),
(2), (4) Date: Jan. 25, 2007

(87) PCT Pub. No.: WO2006/010519

PCT Pub. Date: Feb. 2, 2006

(65) Prior Publication Data

US 2009/0029058 A1    Jan. 29, 2009

(30) Foreign Application Priority Data

Jul. 28, 2004    (EP) .................................. 04017903

(51) Int. Cl.
*B05D 3/02* (2006.01)
*C08L 63/00* (2006.01)
*B32B 27/38* (2006.01)

(52) U.S. Cl. ........................ 427/386; 523/402; 523/403; 523/423; 525/524

(58) Field of Classification Search ....................... None
See application file for complete search history.

(56) References Cited

U.S. PATENT DOCUMENTS

| | | | |
|---|---|---|---|
| 4,315,044 A * | 2/1982 | Elmore et al. | ................ 427/386 |
| 5,177,159 A | 1/1993 | Steinmann et al. | |
| 6,911,237 B1 * | 6/2005 | Fry | .......................... 427/389.9 |

FOREIGN PATENT DOCUMENTS

| | | | |
|---|---|---|---|
| EP | 0658583 B1 | | 6/1995 |
| EP | 0717059 | | 6/1996 |
| JP | 07-309929 A | * | 11/1995 |
| JP | 2001-240727 | | 9/2001 |

OTHER PUBLICATIONS

Machine translation of JP 07-309929 A, provided by the JPO website (1995).*

* cited by examiner

*Primary Examiner*—Michael J Feely
(74) *Attorney, Agent, or Firm*—Connolly Bove Lodge & Hutz LLP

(57) ABSTRACT

A water-dilutable epoxy resin composition ABC of an epoxy resin AB and an emulsifier C, a process for its preparation, and a method of use thereof to make elastic coating films that impart good corrosion resistance even in thin layers. The epoxy resin AB featuring, in its polymer chain, moieties derived from aliphatic polyethers B1 having at least 4 carbon atoms in the alkylene group or from aliphatic polyesters B2 based on linear, branched or cyclic aliphatic polyhydric alcohols B21 and linear, branched or cyclic aliphatic polyvalent acids B22, where the average number of hydroxyl or acid groups in B21 or B22 is at least 1.9. The emulsifier C is a reaction product of an aliphatic polyol C1 and an epoxy resin C2.

10 Claims, No Drawings

US 7,704,559 B2

EPOXY RESINS WITH IMPROVED ELASTICITY

RELATED APPLICATIONS

This application is a national stage application (under 35 U.S.C. 371) of PCT/EP2005/007796 filed Jul. 18, 2005, which claims benefit of European application 04017903.8 filed Jul. 28, 2004.

The present invention relates to epoxy resins with improved elasticity. It also relates to aqueous dispersions of such elastic epoxy resins, to a process for the production of such elastic epoxy resins and aqueous dispersions therefrom, and a method of using such elastic epoxy resins or their aqueous dispersions as adhesives, as coatings, and as sealing materials.

Epoxy resins with improved elasticity have been known from EP-A 0 658 583 and EP-A 0 658 584, where epoxy resins are described that have been modified with polyoxyalkylene monoamines, and from EP 0 735 070 where curing agents for elastic epoxy resins are described. Though the modification with the cited polyoxyalkylene amines improves the elasticity, still higher elasticity is needed. From U.S. Pat. No. 4,423,170, a water reduced epoxy adhesive composition has been known which comprises the reaction product of a diepoxide which is the condensation product of epichlorohydrine with an aromatic diol such as bisphenol A diglycidyl ether, which diepoxide is partially reacted with a polyoxyalkylene amine, and a latent curative. The high amount of ethylene oxide units needed to provide hydrophilicity impairs the corrosion resistance of base metals coated therewith.

It was therefore the underlying problem of the present invention to provide an epoxy resin with further improved elasticity and good corrosion protection. Such resins are made available by the present invention.

The invention therefore relates to an epoxy resin AB comprising, in its polymer chain, moieties derived from an epoxy resin with a polyether structure A which in turn has moieties derived from 1,2,3-trihydroxypropane and moieties derived from aromatic dihydroxy compounds, and from aliphatic polyethers B1 having at least 4 carbon atoms in the alkylene group or from aliphatic polyesters B2 based on linear, branched or cyclic aliphatic polyhydric alcohols B21 and linear, branched or cyclic aliphatic or aromatic polyvalent acids B22, where the average number of hydroxyl or acid groups in B21 or B22 is at least 1.9.

The aliphatic polyether B1 or the aliphatic polyester B2 is linked to the epoxy resin part A by an ether linkage, —O—, or an ester linkage, —CO —O—, or a combination of the two. The ether linkage is formed by the addition of the alcoholic hydroxyl group to the epoxy ring, while the ester linkage is introduced by reaction of the hydroxyl group-terminated polyether molecules B1 or hydroxyl group-terminated polyester molecules B2, or mixtures of these, with a dicarboxylic acid B4 or an anhydride B4' thereof, under formation of a carboxyl group terminated intermediate which reacts with the epoxy terminal groups of an epoxy resin which forms the polyether structure A under ring opening and formation of an ester bond. Another possibility, to build an ester linkage is using a carboxy group terminated polyester B2 which similarly reacts with the epoxy terminal groups of an epoxy resin which forms the polyether structure A under ring opening and formation of an ester bond.

The invention also relates to an epoxy resin ABC which is water-dilutable by incorporation of a reaction product C of an aliphatic polyol C1 comprising, in its structure, at least a mass fraction of 20% of oxyethylene groups, and having a number average molar mass $M_n$ of from 200 g/mol to 20 000 g/mol, with an epoxy resin C2 which has at least two epoxy groups per molecule, and which has an epoxy group content of from 0.5 mol/kg to 10 mol/kg, the ratio of the number of hydroxyl groups in C1 to the number of epoxy groups in C2 being from 1:0.85 to 1:7.

The invention further relates to a process for the preparation of epoxy resins AB with improved elasticity comprising reacting a hydroxy functional aliphatic polyether B1 or a hydroxyl functional aliphatic polyester B2 made by polycondensation of aliphatic polyhydric alcohols B21 and linear, branched or cyclic aliphatic polyvalent acids B22, where the average number of hydroxyl or acid groups in B21 or B22 is at least 1.9, with a dicarboxylic acid B4 or an anhydride B4' thereof, under formation of a carboxyl group terminated intermediate. This intermediate reacts with an epoxy resin which forms the polyether structure A under ring opening and formation of an ester bond through the action of the carboxylic acid groups on the epoxy groups.

The invention also relates to a process where a carboxyl group terminated polyester B2 is reacted with the epoxy terminal groups of an epoxy resin which forms the polyether structure A under ring opening and formation of an ester bond.

In a preferred embodiment, at least two of the hydroxy functional polyether B1 or polyester B2 segments may be linked to each other by at least two urethane bonds, formed by reaction of at least two of the hydroxyl group-terminated polyether molecules B1 or hydroxyl group-terminated polyester molecules B2 with a polyfunctional isocyanate, B3.

This urethane-modified epoxy resin is made by reaction of the hydroxy functional aliphatic polyether B1 or polyester B2 with a multifunctional isocyanate B3 which is introduced in a quantity to make sure that hydroxyl groups are present in stoichiometric excess, ranging from a ratio of the amount of substance of hydroxyl groups to the amount of substance of isocyanate groups from 2:1, thus forming compounds of the type HO-B1-O—CO—N-B3-N—CO—O-B1-OH or the analogue for B2, to 10:9, thus forting compounds of the type HO-B1-[O—CO—N-B3-N—CO—O-B1], —OH or the analogue for B2.

The water-dilutable epoxy resin ABC is made by incorporation of 1 reaction product C of an aliphatic polyol C1 with an epoxy resin C2 which has at least two epoxy groups per molecule, by a process comprising the steps of (a) preparation of an emulsifier C by reaction of an aliphatic polyol C1 of a number average molar mass $M_n$ of from 200 g/mol to 20 000 g/mol, having a mass fraction of oxyethylene units in its structure of at least 20%, preferably a polyoxyethlylene glycol or a hydroxy functional copolyether comprising oxyethylene and oxypropylene groups, with an epoxide compound C2 having at least two epoxy groups per molecule, the ratio of the number of hydroxyl groups in C1 to the number of epoxy groups in C2 being from 1:0.85 to 1:7, which reaction is preferably conducted in the presence of a catalyst such as Lewis acids or complexes thereof, (b) reacting a hydroxy functional aliphatic polyether B1 or a hydroxyl functional aliphatic polyester B2 made by polycondensation of aliphatic polyhydric alcohols B21 and linear, branched or cyclic aliphatic polyvalent acids B22, where the average number of hydroxyl or acid groups in B21 or B22 is at least 1.9, with a dicarboxylic acid B4 or an anhydride B4' thereof, under formation of a carboxyl group terminated intermediate.

(c) reacting this intermediate in mixture with a polyhydric phenol with an epoxy resin which forms the polyether structure A under ring opening and formation of an ester bond through the action of the carboxylic acid groups on the epoxy groups, in the presence of a catalyst such as triphenyl phosphine (d) adding the emulsifier C and water to achieve the desired mass fraction of solids of from about 40% to about 65%.

In a preferred embodiment, step (b) is complemented by first reacting the polyether B1 or the polyester B2 with a substoichiometric amount of multifunctional diisocyanate B3 to supply a chain-extended hydroxy functional compound which is then converted to carboxyl functionality by reaction with the dicarboxylic acid B4 or its anhydride, B4'. It is also possible, in this embodiment, to react the hydroxy functional compound directly with the epoxy resin A.

The aliphatic polyether B1 has oxyalkylene groups with at least 4 carbon atoms in the alkylene group. It is also possible, however, to use copolyethers having minor amounts, i.e. less than 50% of the mass of the oxyalkylene groups, replaced by oxypropylene or oxyethylene groups. It is preferred that the mass fraction of oxyalkylene groups with at least 4 carbon atoms in the alkylene group is at least 50%, more preferably at least 60%, and especially preferred at least 70%, in the mass of all oxyalkylene groups in the polyether B1.

The polyester B2 is either terminated with hydroxyl or with carboxyl groups. In the latter case, as explained supra, it is not needed to react the polyester with a dicarboxylic acid or its anhydride to form a carboxyl group terminated polyester which it turn adds to the epoxy resin by reaction of its carboxyl groups with the oxirane groups. The polyester is based on an aliphatic linear, branched or cyclic polyhydric, i.e. at least dihydric, alcohol B21. The mass fraction of trihydric alcohols or alcohols with still higher functionality is limited, preferably the average number of hydroxyl groups per molecule shall not exceed 2.4, particularly preferred, not exceed 2.3, and most preferred be not more than 2.2. A further constituent of the polyester B2 is a polyvalent acid B22 which is linear, branched or cyclic aliphatic or aromatic. The amount of aromatic and of cycloaliphatic acids is limited and shall not exceed 50%, more preferably not exceed 40%, and especially preferred be not higher than 30%, in the mass of all acids employed in the synthesis of the polyester.

The alcohols B21 are selected from the group consisting of ethylene glycol, propylene glycol, 1,3-dihydroxy propane, 1,4-dihydroxy butane, 1,6-dihydroxy hexane, neopentyl glycol, 1,4-dihydroxycyclohexane, 1,4-cyclohexane dimethanol glycerol, trimethylolethane, trimethylol propane, pentaerythritol, sorbitol, and ditrimethylol ethane, ditrimethylol propane, and dipentaerythritol, and their mixtures.

The acids B22 are preferably aliphatic acids, although a mass fraction in the mass of acids employed in the synthesis of the polyester of up to 30%, preferably up to 25%, and especially preferred, up to 20% of aromatic polyvalent acids can be tolerated. As in the case of the alcohols, divalent acids are preferred, while minor amounts of trivalent and higher functional acids can be used, in conjunction with dicarboxylic acids. The mass fraction of trivalent acids or acids with still higher functionality is limited, preferably the average number of carboxyl groups per molecule shall not exceed 2.4, particularly preferred, not exceed 2.3, and most preferred, be not more than 2.2. Especially preferred are malonic acid, succinic acid, glutaric acid, adipic acid, pimelic and suberic acids, as well as the so-called dimer fatty acids made by dimerisation of unsaturated fatty acids. Cyclic aliphatic acids such as cyclohexane 1,4-dicarboxylic acid, tetrahydro phthalic and hexahydro phthalic acids can also be used, as well as aromatic acids such as terephthalic or isophthalic acids.

The polyfunctional isocyanates B3 which connect two or more of the hydroxyl group terminated polyether B1 or polyester B2 can be aromatic or aliphatic, and are preferably difunctional, although a mass fraction of trifunctional isocyanates or isocyanates with still higher functionality is tolerated. Preferably, the average number of isocyanate groups per molecule shall not exceed 2.4, particularly preferred, not exceed 2.3, and most preferred, be not more than 2.2. Both aliphatic and aromatic isocyanates can be used, alone or in combination, such as 1,6-diisocyanato hexane, isophorone diisocyanate, bis-(4-isocyanatophenyl)methane, tetramethylxylylene diisocyanate and both 2,4- and 2,6-tolylene diisocyanate and the commercial mixture thereof.

The dicarboxylic acids B4 or the anhydrides thereof can also be aliphatic or aromatic, and may be selected from those listed under B22, with the proviso that only dicarboxylic acids may be used.

The aliphatic polyols C1 have a number average molar mass $M_n$ of from 200 g/mol to 20 000 g/mol, and a mass fraction of oxyethylene units in their structure of at least 20%. Preferred are polyoxyethylene glycols or hydroxy functional copolyethers comprising oxyethylene and oxypropylene groups. They are reacted with an epoxide compound C2 having at least two epoxy groups per molecule, the ratio of the number of hydroxyl groups in C1 to the number of epoxy groups in C2 being from 1:0.85 to 1:7, the reaction preferably being conducted in the presence of a catalyst such as Lewis acids or complexes thereof.

The epoxy resins with improved elasticity of the present invention can be used to formulate adhesives, coating compositions, sealing compositions, and fillets. They can be used in bulk, in solvent borne form, with reactive diluents or in aqueous dispersion. Depending on the supply form they are cured with latent curatives, such as dicyandiamide, with solvent borne curatives, or with aqueously dispersed curatives. In comparison with unmodified epoxy resins, the epoxy resins of the present invention show improved elasticity, less propensity to crack formation when applied in thick layers, improved adhesion to substrates such as metals and concrete, and they impart improved corrosion protection.

These advantageous properties are shown in the examples.

EXAMPLES

Example 1

Preparation of a Modifier Resin 1300 g of poly(oxy-1,4-butylene) glycol with a number average molar mass of 650 g/mol were heated to 80° C., then 174 g of a commercial mixture of toluylene diisocyanate isomers were added under stirring. The reaction mixture was kept under these conditions until no more free isocyanate was detectable (mass fraction of NCO groups was less than 0.1%). The reaction mixture was heated to 150° C., then 296 g of phthalic anhydride were added. The reaction mixture was stirred at 150° C. until the acid number had reached 70 mg/g. 1770 g of pale yellow resin were isolated.

The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

Example 2

Preparation of an Emulsifier 1500 g of a commercial polyethylene glycol with a number average molar mass $M_n$ of 3000 g/mol and 185 g of a bisphenol A based epoxy resin having a specific content of epoxy groups of 5.4 mol/kg were heated to 100° C. Under stirring, 8 g of boron trifluoride-diethyl ether complex were added, as a solution in 1,4-dioxane, of 5 g/100 g strength. The temperature was raised to 130° C. and kept until the specific epoxy group content had reached a constant level. The ratio of the number of epoxy and hydroxyl groups was 1:1 in thus case, the final specific epoxy group content was 2.7 mmol/kg.

Example 3

Modified Aqueous Epoxy Resin Dispersion 1200 g of the resin of Example 1 were heated in a flask to 125° C. 11 g of bisphenol A and 4380 g of bisphenol A diglycidyl ether were added, together with 6 g of triphenyl phosphine catalyst. The temperature of the mixture rose to 150° C. due to the heat of reaction. The mixture was kept at this temperature under stirring until the specific content of epoxy groups, defined as the amount of substance $n_{EP}$ of epoxy groups divided by the mass $m_B$ of the (solid) resin, had reached 2 mol/kg. The contents of the flask were then cooled to 100° C. whereupon 628 g of methoxypropanol were added. Under stirring, 950 g of the emulsifier of Example 2 were added. The temperature was lowered further to 80° C., and 5639 g of deionised water was added under careful stirring.

Example 4

Aqueous Curative

An aqueous amine-type hardener was prepared as described in EP-A 0 000 605, Example 1B, but without addition of the acrylonitrile. This hardener had a mass fraction of solids of 80%, and a specific content of amine hydrogen atoms of 8.6 mol/kg.

Example 5

Preparation of an Aqueous Two Pack Coating Composition 100 g of the dispersion of Example 3 were mixed with 23.2 g of the curative of Example 4, diluted to a mass fraction of solids of 40% by addition of water, and a further 5.8 g of water. The viscosity of the mixture was determined according to DIN EN ISO 3219 at 23° C., and a shear rate of 25 s$^{-1}$, to be 1125 mPa·s. The pot life of this mixture, i.e. the time during which, counted from the moment of mixing the ingredient intimately, until the point in time when the resin dispersion did not form any longer a coherent film on the substrate, was three and one half hours. The dust-free drying time was one hour, and the tack-free drying time (at 99° C. and a relative humidity of 45%) was 6 hours.

Examples 6

Comparative Epoxy Resin Dispersion

A commercial dispersion of a flexibilised type I epoxy resin in a mixture of isopropanol and water (®Beckopox EP 385, Surface Specialties Germanic GmbH & Co. KG; mass fraction of solids 56%, mass fraction of water 42%, mass fraction of isopropanol 2%; specific epoxide group content 2.0 mol/kg) was mixed with 26 g of the curative dispersion of Example 4, again diluted to a mass fraction of solids of 40% by addition of water. The viscosity of the mixture, determined as described supra, was 636 mPa·s, the pot life was taco and one half hours, the dust-free and tack-free drying times were the same as in Example 5.

Example 7

Comparative Testing

The mechanical and chemical resistance properties measured on a coated steel sheet were as shown in table 1:

TABLE 1

| Property | Unit | Dispersion of Ex. 5 | Comparative (Ex. 6) |
|---|---|---|---|
| Pendulum Hardness (König) | | | |
| after 24 hours | s | 49 | 49 |
| after 48 hours | s | 76 | 71 |
| after 7 days | s | 104 | 112 |
| Flim Thickness | μm | 31 to 44 | 46 to 56 |
| Erichsen Indentation | mm | 5.7 | 4.9 |
| Gardner Impact$^m$ | in · lb | <5 | <5 |
| Gardner Impact$^e$ | in · lb | 50 | 40 |
| Cross Hatch | | Gt 0 | Gt 0 |
| Chemical Resistance | | | |
| Salt Spray Test$^s$ | h | 124 | <24 |
| Humidity | h | 2000 | 500 |

Explanations:
$^m$the steel ball falls on the (uncoated) metal side
$^e$the steel ball falls on the coated side
$^s$time until the cotrosion length underneath the coating is 2 mm
Salt Spray Test and Humidity Test were performed by coating untreated steel sheets.
Gt 0 is the best rating in the Cross Hatch Test.

It car be seen from this test that both flexibility) (Erichsen test, impact test) and corrosion resistance have been markedly improved. Improved results can already be achieved with thinner coatings.

The invention claimed is:

1. A water-dilutable epoxy resin composition ABC comprising an epoxy resin AB which epoxy resin AB comprises, in its polymer chain, moieties derived from aliphatic polyethers B1 having at least 4 carbon atoms in the alkylene group or from aliphatic polyesters B2 based on linear, branched or cyclic aliphatic polyhydric alcohols B21 and linear, branched or cyclic aliphatic polyvalent acids B22, where the average number of hydroxyl or acid groups in B21 or B22 is at least 1.9, and an emulsifier C wherein said emulsifier C is a reaction product of an aliphatic polyol C1 comprising, in its structure, at least a mass fraction of 20% of oxyethylene groups, and having a number average molar mass $M_n$, of from 200 g/mol to 20 000 g/mol, with an epoxy resin C2 which has at least two epoxy groups per molecule, and which has an epoxy group content of from 0.5 mol/kg to 10 mol/kg, the ratio of the number of hydroxyl groups in C1 to the number of epoxy groups in C2 being from 1:0.85 to 1:7.

2. The water-dilutable epoxy resin composition ABC of claim 1, wherein the moiety derived from the aliphatic polyether B1 or the aliphatic polyester B2 is linked to the epoxy resin by ester bridges based on a linear, branched or cyclic aliphatic or aromatic dicarboxylic acid B4.

3. The water-dilutable epoxy resin composition ABC of claim 2 where B4 is a cycloaliphatic dicarboxylic acid.

4. The water-dilutable epoxy resin composition ABC of claim 1, wherein the moiety derived from the aliphatic polyether B1 or the aliphatic polyester B2 is linked to the epoxy resin by ether bridges.

5. The water-dilutable epoxy resin composition ABC of claim 1, wherein the polyether B1 comprises, in its polymer chain, at least two urethane linkages.

6. The water-dilutable epoxy resin composition ABC of claim 1, wherein the aliphatic polyether B1 has a mass fraction of repeating units of at least 50% of 1,4-oxybutylene.

7. The water-dilutable epoxy resin composition ABC of claim 1, where the mass fraction of linear aliphatic alcohols in component B21 is at least 50%, and the mass fraction of linear aliphatic dicarboxylic acids with at least 6 carbon atoms in B22 is at least 50%.

8. A process for the production of the water-dilutable epoxy resin compositions ABC of claim 1, comprising the steps of
    (a) preparation of an emulsifier C by reaction of an aliphatic polyol C1 of a number average molar mass $M_n$ of from 200 g/mol to 20 000 g/mol, having a mass fraction of oxyethylene units in its structure of at least 20%, preferably a polyoxyethylene glycol or a hydroxy functional copolyether comprising oxyethylene and oxypropylene groups, with an epoxide compound C2 having at least two epoxy groups per molecule, the ratio of the number of hydroxyl groups in C1 to the number of epoxy groups in C2 being from 1:0.85 to 1:7, which reaction is preferably conducted in the presence of a catalyst such as Lewis acids or complexes thereof,
    (b) reacting a hydroxy functional aliphatic polyether B1 or a hydroxy functional aliphatic polyester B2 made by polycondensation of aliphatic polyhydric alcohols B21 and linear, branched or cyclic aliphatic polyvalent acids B22, where the average number of hydroxyl or acid groups in 621 or B22 is at least 1.9, with a dicarboxylic acid 84 or an anhydride B4' thereof, under formation of a carboxyl group terminated intermediate,
    (c) reacting this intermediate in mixture with a polyhydric phenol with an epoxy resin which forms the polyether structure A under ring opening and formation of an ester bond through the action of the carboxylic acid groups on the epoxy groups, in the presence of a catalyst such as triphenyl phosphine
    (d) adding the emulsifier C and water to achieve the desired mass fraction of solids of from about 40% to about 65%.

9. The process of claim 8, wherein step (b) is complemented by first reacting the polyether B1 or the polyester B2 with a substoichiometric amount of multifunctional diisocyanate 63 to supply a chain-extended hydroxy functional compound which is then converted to carboxyl functionality by reaction with the dicarboxylic acid B4 or its anhydride, 84'.

10. A method of use of the water-dilutable epoxy resin compositions ABC of claim 1, comprising mixing the water-dilutable epoxy resin composition ABC with a curing agent selected from the group consisting of acid curing agents, aminic curing agents having at least one primary or secondary amino group or at least two tertiary amino groups, and applying the mixture to a substrate selected from the group consisting of metal sheets, plastic sheets, concrete, and curing the applied layer.

* * * * *